DIGITAL FREQUENCY SELECTOR

Filed Nov. 25, 1963 4 Sheets-Sheet 1

Inventor:
Everett R. Geis
By: James J. Jennings, Jr. Atty.

Oct. 11, 1966 E. R. GEIS 3,278,727

DIGITAL FREQUENCY SELECTOR

Filed Nov. 25, 1963 4 Sheets-Sheet 2

Inventor:
Everett R. Geis
By: James J. Jennings, Jr. Atty.

Inventor:
Everett R. Geis
By: James J. Jennings, Jr. Atty.

Inventor:
Everett R. Geis
By: James T. Jennings, Jr. Atty.

United States Patent Office 3,278,727

Patented Oct. 11, 1966

3,278,727

DIGITAL FREQUENCY SELECTOR

Everett R. Geis, Orange, Calif., assignor to Borg-Warner Corporation, Chicago, Ill., a corporation of Illinois Filed Nov. 25, 1963, Ser. No. 325,816
8 Claims. (Cl. 235—92)

This invention is directed to a control system, and more particularly to a novel frequency selector circuit for providing a precise, readily controlled timing signal for regulating the frequency of an output signal.

Various systems have been utilized for accepting timing pulses from a suitable source, counting the number of pulses received until a preset total is obtained, and issuing a single output pulse for regulating the timing of a square wave or other signal to operate associated equipment, such as static inverter connected to drive an electric motor. The input pulses are supplied at a reference frequency, so that by setting a predetermined number or count on conventional selector switches connected to a decade counter, receipt by the counter of the predetermined number of pulses produces a single output pulse, thus in effect regulating the frequency of the output pulse by varying the count or the total number set in the counter.

One conventional system employs a plurality of digit counting circuits (units digit, tens digit, etc.) coupled between the timing pulse generator and the selector switches, and the output circuit of the selector switches is coupled to a suitable gating logic circuit. Thus the counter must accumulate a number of input pulses equal to the count which is preset on the selector switches before a single output pulse is issued. With this system, the response time of the first circuit or decade counter (units) which receives the input pulses must be exactly the same as the last decade which accumulates the highest count (for example, the last decade might register the thousands digit, with the tens and hundreds decades coupled intermediate the units and thousands decades). With such an arrangement, assuming that an input signal alternating at a frequency of one megacycle is used, then the period of each pulse is one microsecond, or a half-microsecond if the positive-going and negative-going portions of the pulses are of equal duration. In general, each decade circuit comprises four bistable multivibrator circuits, conventionally designated "flip-flops," connected in a 1–2–4–8 counting array. With such an arrangement, manifestly the time delay for each flip-flop (FF) must be less than 0.11 microsecond. Even though the thousands decade is only actuated at a relatively low frequency, one kilocycle as compared to one megacycle for the units decade, nevertheless the transit time or delay in each decade must be the same to immediately register the count and transfer the proper signal across the selector switches to the gating logic arrangement. For example, if a count of 2000 were set in the switches and a total of 1999 had already been registered in the decade counter, the next input pulse applied to the units decade should change the state of each of the four decades, and for proper operation this should occur in less than 0.11 microsecond, as the decades are then reset to register the next series of input pulses. Accordingly, conventional systems must use the high frequency flip-flop counters to provide the requisite speed of operation; such arrangement is necessarily expensive.

It is therefore a primary object of the present invention to provide a digital frequency control system with a more economical counter arrangement, and in particular, one which includes a novel decade counter in which the response times of the different decades are related to the required frequency of operation of each decade.

The foregoing and other objects of the present invention have been realized by producing a novel decade counter and switching arrangement in which, instead of setting the desired number (2000 in the previous example), a complementary number is inserted in the system as the selector switches are adjusted. Suppose, for purposes of understanding the invention, that instead of detecting a count of 2000, the decade counter arrangement is tallying a count of 9999. After being set to this total, the thousands counter has 999 microseconds to stabilize; the hundreds decade has 99 microseconds to stabilize; the tens digits counter has 9 microseconds to stabilize; and the units digits counting circuit, even as in the previous example, has one microsecond to stabilize. Accordingly, when this system is used to detect the count of 9999, the only counting decade that would require a low propagation time is the first or units decade; all of the remainder may have relatively long propogation times, as just described, and thus be made with more economy.

In the preferred embodiment of the invention, the selector switching arrangement coupled to the decade counting stages is, in effect, wired backward. That is, the circuit arrangement is such that instead of inserting the desired number for frequency selection, the 9's complement of the number (obtained by substracting the desired number plus one from 10,000, or whatever other maximum total can be registered) is actually registered on the switches, so that each time the desired count is obtained the maximum stabilization times will be obtained for all of the individual decades in the system.

In accordance with another important aspect of the invention, a second set of selector switches may be provided and wired in parallel with the first set, and a single selector switch determines whether one or the other of the selector switch sets regulates the desired count. Such an arrangement enables a new frequency of operation to be set up on the alternative switch set, so there is no undesired disturbance of the output frequency of this system when the system frequency is changed from a first to a second control frequency by correspondingly changing to operation from the first to the second set of control switches.

Now in order to acquaint those skilled in the art with the best mode contemplated for making and using the invention, a preferred embodiment thereof will be described in connection with the accompanying drawings, in the several figures of which like reference numerals identify like elements, and in which.

*Known arrangement (FIGURE 1)*

Figures 1, 2, 3:
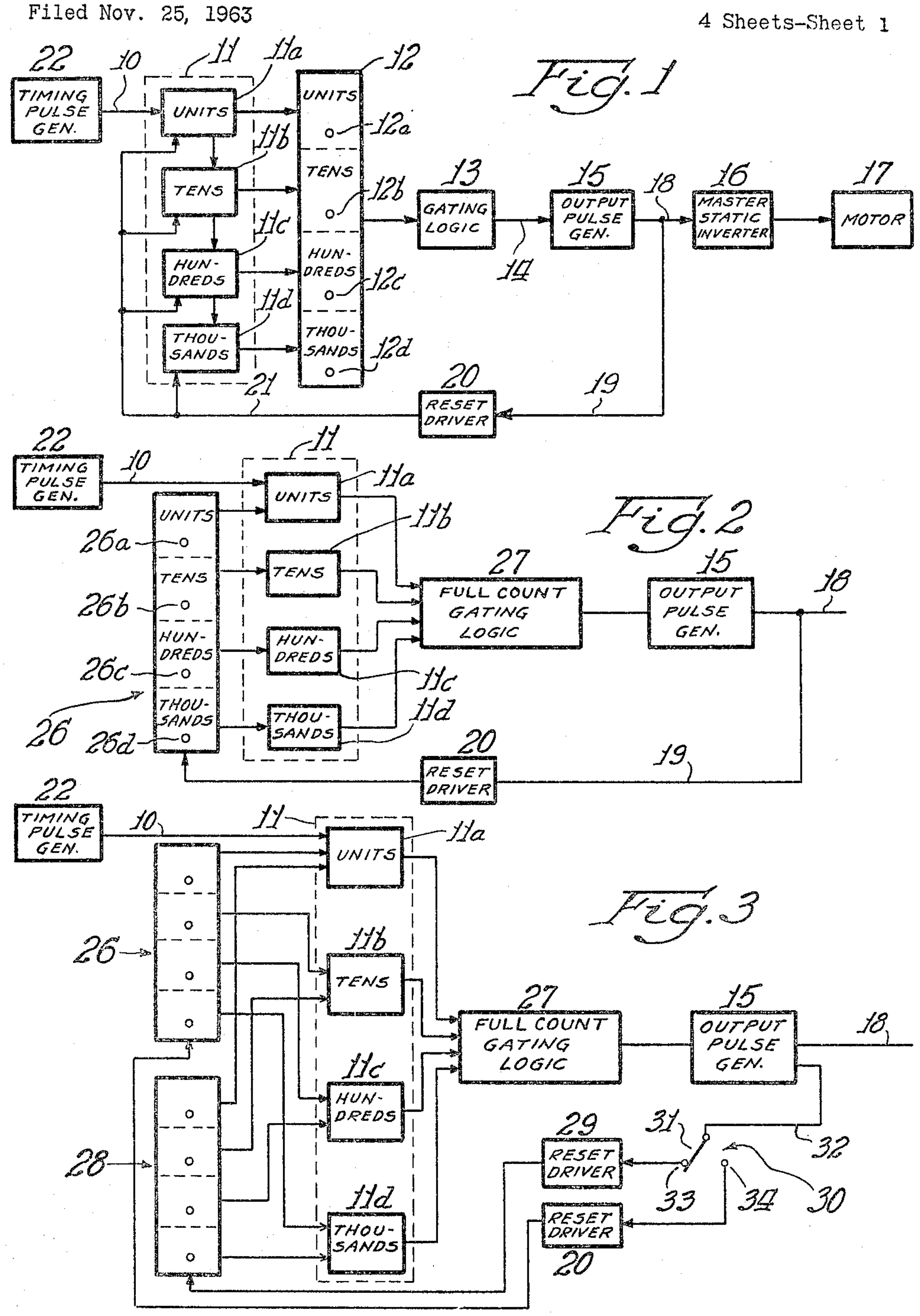
FIGURE 1 is a block diagram of a known digital frequency selector arrangement.
FIGURE 2 is a block diagram illustrating a first embodiment of the present invention.
FIGURE 3 is a block diagram of a preferred embodiment of this invention.

FIGURE 1 illustrates a frequency control system for receiving input pulses at a predetermined frequency over an input circuit 10, accumulating in a counter 11 the total number of input pulses received, and, when the predetermined total as set on selector switch 12 coincides with the count accumulated in counter 11, gating logic circuit 13 issues a single timing or control pulse over an output circuit 14. Such timing pulse is applied to output pulse generator 15, thus regulating the frequency of the square wave output of master static inverter 16, in turn controlling the frequency of operation of an electric motor 17. A portion of the output pulse supplied over conductor 18 to the static inverter is also applied over conductor 19 to operate a reset driver 20, which applies a suitable reset signal, over conductor 21, to each of the individual digit counting circuits 11*a*–11*d* within counter 11. Responsive to receipt of the reset signal over conductor 21, each of the digit counting circuits is set to a 0 condition (if it is not already in that state) and again begins to accumulate the total number of impulses received from timing pulse generator 22 over input circuit 10. This operation is repeated at a frequency determined by the input information registered in selector switch arrangement 12, which information is inserted by manual positioning of the individual knobs 12*a*, 12*b*, 12*c* and 12*d*.

*Structure and operation of the invention (FIGURE 2)*

Inspection of FIGURE 2 indicates that the timing pulse generator and input circuit arrangement, the counter disposition, and the output pulse generator and reset driver units are similar to the previously described arrangement. However, in accordance with the present invention, a novel selector switch arrangement 26 is provided which, responsive to insertion of information over the respective switches 26*a*–26*d*, provides over its output connections to the individual digit counting circuits 11*a*–11*d* within counter 11, information denoting the complement of the number inserted by manipulation of the switches. Because the desired number and its complement always equal the same sum, counter 11 always operates to register the same count. As described in the introduction, this count is chosen to give the maximum stabilization time for the individual digit counting circuits within counter 11, with the result that only the units counting circuit 11*a* need be of a high frequency response, related to the frequency of input pulses received over circuit 10, whereas the other digit counting circuits 11*b*–11*d* may be of a much slower response time. In this way significant economies are realized in the construction of the invention.

Further in accordance with the present invention, the gating circuit of the conventional counter arrangement is replaced by a full count gating logic circuit 27, which operates to issue a single output pulse responsive to the attainment of the full count within counter 11. The remainder of the interconnection and operation of the system shown in FIGURE 2 is manifest from the previous explanation and the showing of FIGURE 1.

*General description of the invention as shown in FIGURE 3*

FIGURE 3 depicts, in general form, a preferred embodiment of the present invention. It will be noted that in addition to a first selector switch arrangement, referenced 26 in FIGURE 2, an additional selector switch 28 is provided in FIGURE 3 and its output connections are likewise individually applied to each of the digit counting circuits 11*a*–11*d* within counter 11. In accordance with this embodiment of the invention, a switch arrangement 30 is provided and movable arm 31 of this switch is coupled over a conductor 32 to the output side of pulse generator 15. Switch 30 also includes a first fixed contact 33, which is coupled to the input side of reset driver circuit 29, and a second fixed contact 34, coupled to the input side of reset driver unit 20. Accordingly, the position of the movable arm 31 of switch 30 determines which of the reset drivers receives a pulse when an output pulse is issued from the output pulse generator, and thus determines which of the selector switch arrangements 26 and 28 is utilized to insert the complement number within counter 11 to commence a second count after the predetermined count has been initially accumulated. As will become clear from the subsequent explanation, this permits a new count to be inserted into the system (to effect a desired frequency change) without any undesired aberrations in the operating frequency of the motor. For example, if selector switch 28 is being used to determine the frequency of operation, and if it is desired to change the frequency of operation, the new frequency can be inserted by setting the proper count (number of input pulses) for the desired total on selector switch arrangement 26. After the count is thus set, switch arm 31 is displaced to its alternate position, and thereafter the frequency of operation is determined by the setting of the individual knobs on selector switch 26.

Figure 4:
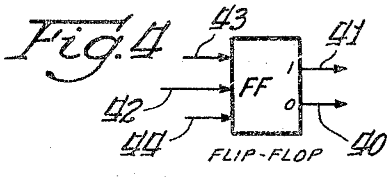
FIGURE 4 is a simplified showing of a single "flip-flop" stage, useful in understanding the explanation of the subsequent figures.

To facilitate the subsequent explanation, FIGURE 4 shows a single "flip-flop" stage, which may be a bistable multivibrator arrangement; such a circuit is well known and and frequently used in this art. More specifically, such arrangement provides an output signal continually over either output conductor 40, to indicate a value or state 0, or over output conductor 41, to indicate the value or condition 1. Each of these states is mutually exclusive, so that the output signal is only applied over one of conductors 40 and 41 at any particular time. In the subsequent figures, a line applied to the center of the flip-flop, such as line 42 in FIGURE 4, is considered to apply a trigger signal to the flip-flop such that it is changed from one to another of its states. Specifically, if an output signal denoting 0 is present at conductor 40 and thereafter a trigger signal is received over conductor 42, the state of the flip-flop changes so that an output signal is continually applied over conductor 41 to denote value 1. Receipt of a subsequent trigger pulse over conductor 42 is effective to again change the state from 1 to 0, removing the signal from conductor 41 and applying the signal over conductor 40. Alternate input connections are also provided, with a control pulse received over input conductor 43 being effective to provide an output signal over conductor 41, irrespective of the state of the flip-flop prior to receipt of this control signal. In an analogous manner, receipt of a control signal over conductor 44 ensures that the output signal of the flip-flop stage is provided over conductor 40 to indicate 0, irrespective of the state in which the flip-flop was positioned prior to receipt of such control signal. In the simplified showing of FIGURES 5A–5C, only the input connections necessary to understand the operation of each stage will be depicted. The legend FF will indicate a flip-flop circuit, and OS will denote the well known "one-shot" circuit which issues a single output pulse and returns to its original state after receiving an input pulse.

*Detailed description of the invention (Figures 5A–5C)*

Figure 5A:
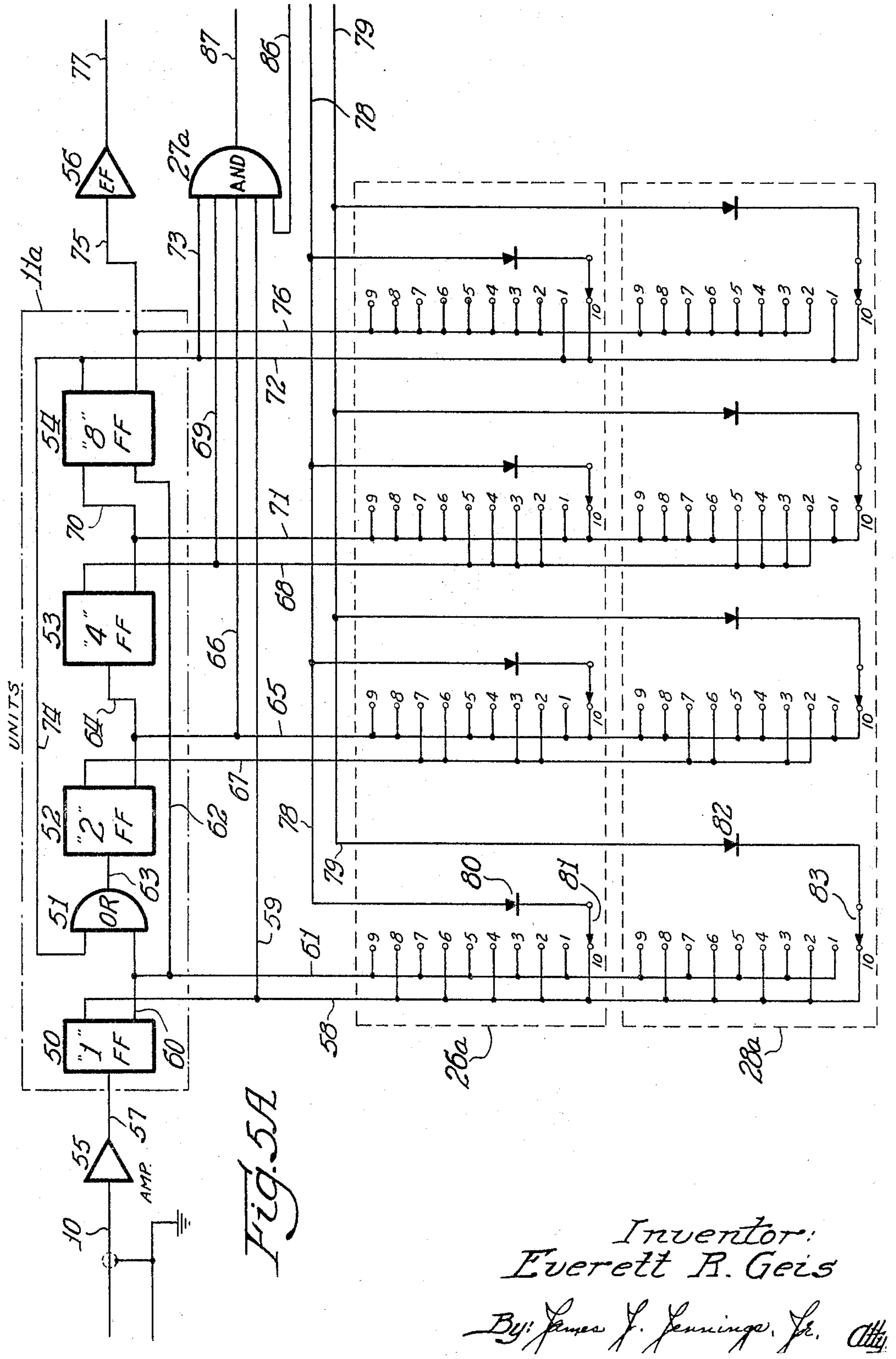
FIGURES 5A, 5B, and 5C are, when taken together, a composite block diagram, partly in schematic form, depicting in detail the system structure and operation of the preferred embodiment of the invention depicted generally in FIGURE 3.

The arrangement and operation of the circuitry illustrated in FIGURES 5A–5C will be suggested by the arrangement in FIGURE 3, but before considering the diagram of FIGURES 5A–5C in more detail, a single digit counting circuit, specifically circuit 11*a* in FIGURE 5A, will first be described.

Sequentially connected within digit counting circuit 11*a* are the first flip-flop stage 50, for signifying the binary 0 and 1 in a binary 1–2–4–8 counting chain arrangement, an OR stage 51, a binary 2 stage 52, a binary 4 stage 53, and a stage 54 for registering 8 in the binary system. Input signals are received from input circuit 10, pass through an amplifier 55, and are applied as a trigger signal to first flip-flop stage 50. In the illustrated embodiment, digit counting circuit 11*a* at all times indicates the count of the units, where "count" is the total or sum of the units value inserted over switch 26*a* or 28*a* plus the number of units-denoting pulses received over input circuit 10; the three other circuits to be described subsequently register respectively the tens, hundreds, and thousands digits of the predetermined total to be accumulated before a single output pulse is issued. In addition to the counting circuit 11*a*, a pulse transfer stage 56, which may be a well known emitter-follower (EF) stage, is coupled to the binary 8 stage 54 for translating an output pulse to the next higher order of digit counting circuit responsive to the accumulation of a count of ten, representing the sum of the value inserted over switch 26*a* or 28*a* plus the number of received input pulses, within the first digit counting chain circuit 11*a*.

It is initially emphasized that in considering the operation of circuit 11*a*, the particular setting of switch sections 26*a* and 28*a* may be ignored, in that this switching circuitry comes into play only in applying the complementary value upon receipt of the reset pulse to the specific counting chain circuit. The operation of the counting chain arrangement is unchanged, irrespective of the presence or absence of the selector switches connected to apply the reset pulse. That is, without being preset to any initial value as the reset pulse passes through either switch section 26*a* or 28*a* to the circuit 11*a*, this counting circuit 11*a* will accumulate ten input pulses over circuit 10 before issuing a single output pulse over conductor 75. By way of example, if the reset pulse were utilized through one of the switch sections 26*a*, 28*a*, to initially set circuit 11*a* to register a count of seven before the first input pulse was received over conductor 10, receipt of the next three input pulses over conductor 10 would register a count or sum of ten in circuit 11*a*, and circuit 11*a* would then issue an output pulse over conductor 75.

Prior to receipt of a first pulse or input signal over conductor 10, amplifier 55, and conductor 57 for application to stage 50, each of stages 50, 52, 53, and 54 is in the 0 condition. For purposes of this explanation, operation in the complementary sense may be ignored, and it is assumed that counting chain circuit 11*a* starts from an at rest or 0 indicating condition. As the first pulse is applied to stage 50, the state of this flip-flop is changed from 0 to the 1 condition. An output signal indicative of this change in status is applied over conductors 58 and 59 to one input connection of section 27*a* of the gating logic arrangement, for purposes to be described subsequently. As a second impulse is applied over conductor 57 to stage 50, this stage is returned to the 0 condition, with a corresponding output signal being applied over conductor 60 to the lower connection of OR stage 51, and over conductors 61 and 62 to the lower input connection of stage 54. This signal application to stage 54 is ineffective, in that this flip-flop was already in the 0-indicating condition. However, the impulse applied through OR circuit 51 is passed over conductor 63 to the trigger input of FF 52, changing the stage of this flip-flop to the 1 condition. Thus after the receipt of two impulses, flip-flop 52 is in the 1 candition, and each of the flip-flops 50, 53, and 54 is in the 0 state.

The third pulse or input signal received over conductor 57 changes the state of stage 50 in a manner obvious from the preceding description, so that both stages 50 and 52 are now in the 1 condition. Receipt of the fourth pulse returns stage 50 to the 0 condition, sending a signal over conductor 60, OR circuit 51 and conductor 63 which returns stage 52 to the 0 condition, which stage transmits an output signal over conductor 64 to stage 53, changing the state of the 4 flip-flop to the 1-indicating position. Simultaneously a signal is also transferred over conductors 64, 65, and 66 to another input connection of gate circuit 27*a*. At this time only stage 53 is in the 1 condition.

The fifth incoming pulse changes the state of stage 50, and receipt of the sixth impulse changes the state of both stages 50 and 52, so that at this time only stages 52 and 53 are in the 1 state. Receipt of the seventh input pulse over conductor 57 returns the stage 50 to the 1-indicating condition, so that all of the first three binary counting stages 50, 52, and 53 are in the 1-signifying condition.

As the eighth input signal is received over conductor 57, stage 50 is returned to the 0 condition, an output signal passes over conductor 60, OR circuit 51, and conductor 63 to return stage 52 to the 0 condition, passing another output signal over conductor 64 to stage 53 to return this stage to the 0 condition. At this time an output signal is applied over conductor 70 to the upper signal input connection of flip-flop 54, to change the state of this stage from the 0 to the 1-indicating condition.

As stage 54 is changed to the 1 condition, a constant signal indicating such change is passed over conductors 72 and 73 to the uppermost input connection of gate circuit 27*a*. The same signal is applied over conductor 74 to the upper input connection of OR circuit 51, which signal passes through this circuit and over conductor 63 to the input side of stage 52. The nature of this signal is such that, so long as stage 8 is in the 1 condition and a signal is applied through the upper part of OR circuit 51 to stage 52, any signal applied from first stage 50 over conductor 60 which attempts to pass through the OR to change the state of stage 52 is ineffective. As a practical matter, this is accomplished by establishing a potential on conductor 63 at or above the limit of the signal which passes over conductor 60 to carry digit-counting information. To assist those skilled in the art, a specific designation of the circuit 50 and its commercial source will be given at the end of the specification.

Accordingly, upon receipt of the ninth input signal over conductor 57, the only stage affected is stage 50, which is changed from the 0 to the 1 condition. Upon receipt of the tenth input signal, the state of this stage is returned to 0, and an output pulse transferred over conductor 60 toward the OR circuit is ineffective to alter the condition of the 2 flip-flop 52 for the reasons just described.

However, the same output signal is transferred over conductors 60, 61, and 62 to the lower input connection of stage 54, returning this stage to the 0 state. At this moment all four of the stages 50, 52, 53 and 54 are in the 0-indicating condition. With the change of state of stage 54, an output signal is transferred over conductor 75, through emitter-follower stage 56 and over conductor 77 to the next higher order of digit counting circuit, which is the tens circuit. Conductor 76 is connected to conductor 75 for use in the reset operation. It is emphasized that with this change in state of stage 54, the blocking signal is removed from conductor 74 and the upper input connection of the OR circuit, so that upon receipt of the next pulse over conductor 57, stage 50 will be changed to the 1 condition, and upon receipt of the twelfth input pulse, stage 50 will be returned to the 0 condition and stage 52 changed to the 1 condition, exactly as in registering the first and second input pulses.

The disposition and interconnection of the selector switches 26 and 28 are given in sufficient detail in the drawing so as to obviate the requirement of a detailed, terminal-by-terminal description. It will readily be appreciated that a reset pulse received over conductor 78 when selector switch arrangement 26 is in use, is applied through diode 80 (and simultaneously through each of the other diodes coupled to line 78) to whichever one of the terminals is engaged by movable switch 81. When selector switch 28 is in the circuit, the reset pulse supplied over conductor 79 is passed through diode 82 (and concomitantly through the similarly-connected diodes) and switch portion 83 to whichever one of the specific terminals has been selected by manual positioning of switch portion 83. After passing through the selector switch, the reset impulse is applied upwardly over conductor pairs 58 and 61, 67 and 65, 68 and 71, and 72 and 76, to the output connections of stages 50, 52, 53, and 54. In the preferred embodiment, transistors were used in the flip-flop stages, and the reset signal was applied directly to the collectors (output connections) of each stage to force each binary stage into the desired condition (0 or 1). It is manifest that the value of the count inserted by forcing stages 50, 52, 53, and 54 into a certain value-indicating arrangement by application of the reset pulse reduces the number of input pulses which must be received over conductor 10 before a single output pulse issues over conductor 75, and this reduction is by an amount equal to the count preset in stages 50, 52, 53, and 54.

Considering now the first section **27*a* of the full count gating logic arrangement, input signals must be received simultaneously over each of the input conductors 73, 69, 66, 59, and 86 to produce an output signal over output conductor 87. This arrangement, when used with the hereinafter specifically identified gating circuit 27*a*, provides an output signal over conductor 87** only when all of the required inputs are present, without any undesired noise passing through this gate when less than all of the required input intelligence is accumulated.

Figure 5B:
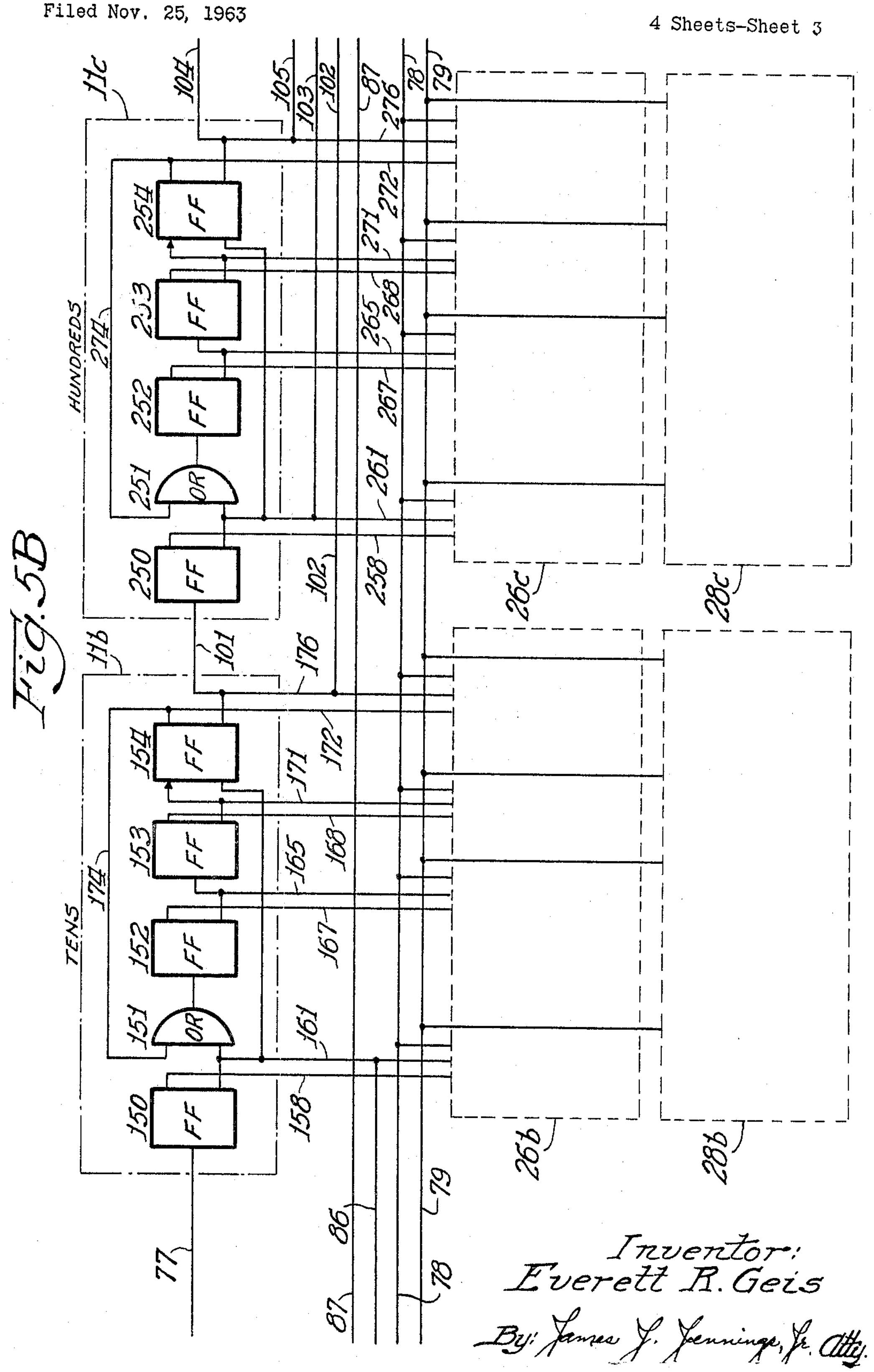

Considering now FIGURE 5B, digits counting circuit **11*b* is used to indicate the number of impulses denoting the tens digit. In that the tens digit connections, including the associated provision and interconnection of switch sections 26*b* and 28*b*, are exactly similar to those depicted in the first digit counting circuit 11*a* and switch sections 26*a* and 28*a*, no further explanation is necessary for a full understanding of the construction and operation of the invention. The reference numerals used in circuit 11*b* and the associated conductors are related to those in the analogous places in the first digit counting circuits, with the addition of 100 to show the relationship of these two portions to the circuit. In like manner, the stages and associated conductors of hundreds counting circuit 11*c* are referenced in the 200 series, and it will be understood that switch sections 26*c* and 28*c* are exactly the same as those shown in FIGURE 5A and referenced 26*a* and 28*a***.

Responsive to receipt of a number of pulses over conductor 77 which together with the value inserted by the reset pulse over switch section **26*b* or 28*b* provides a total of ten, stages 150, 152, 153, and 154 are driven to register a count of ten and a single output pulse is issued over conductor 101 and applied to stage 250 in the hundreds digit counting circuit 11*c*. Simultaneously the output pulse is also applied over conductors 176 and 102 to one input connection of gate circuit 27*b* (FIGURE 5C). Conductor 103 (FIGURE 5B) receives an output signal each time flip-flop 250 is returned to the 0 condition. After the hundreds digit counting arrangement 11*c* has also been operated to register a count of ten by tallying the receipt of a number of input signals over conductor 101 which, together with the value preset as the reset pulse received over conductor 78 or 79 passes through switch section 26*c* or 28*c*, completes a count of ten, a single output pulse is issued from flip-flop 254 and passed over conductor 104 to the thousands digits counting circuit, and an output signal is also applied over conductor 105 to the second portion 27*b*** of the gate circuit.

Figure 5C:
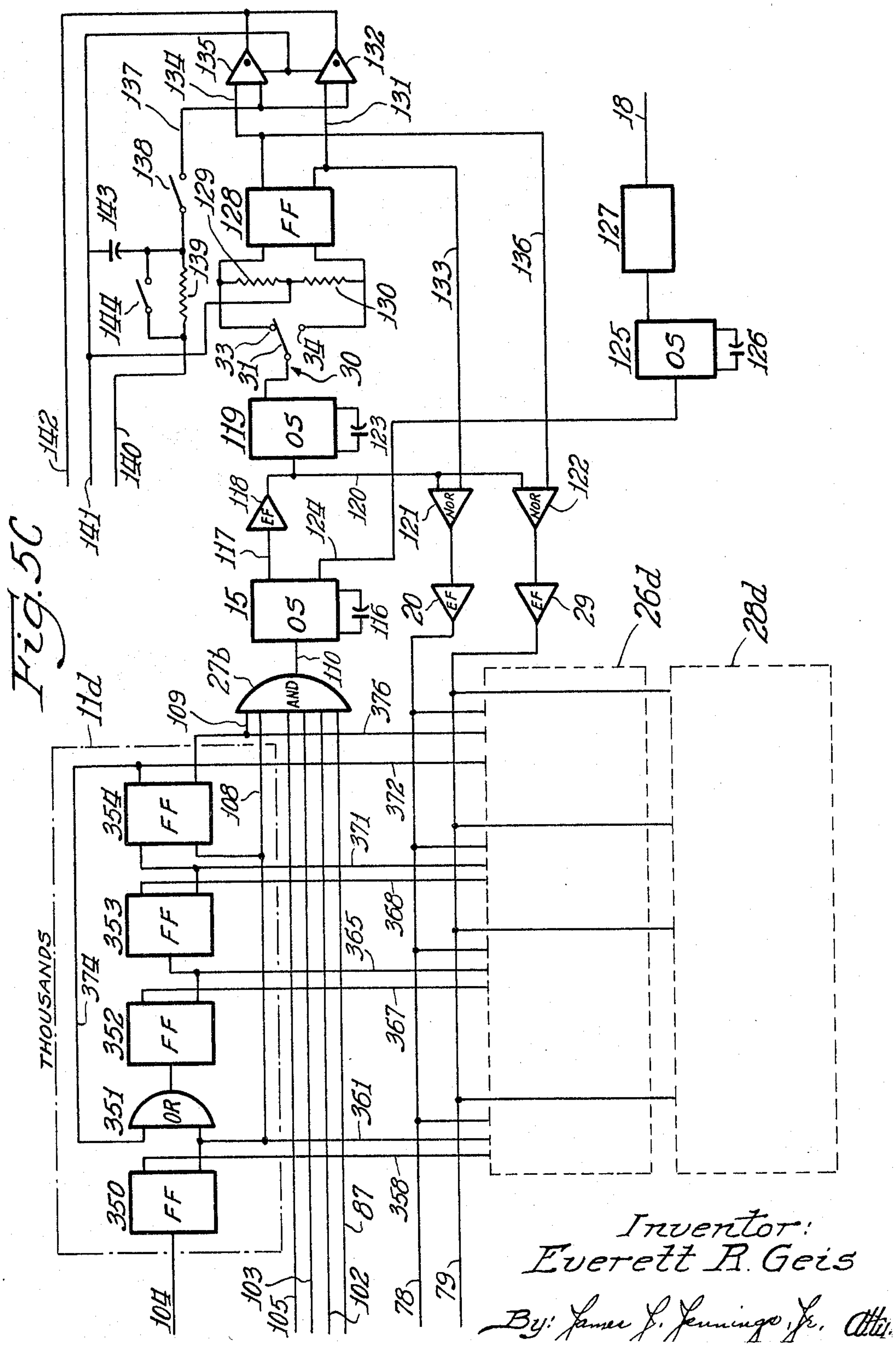

Referring now to the circuitry depicted in FIGURE 5C, thousands digit counting circuit **11*d* is similar in all respects to the previously-described units digit counting circuit 11*a*, and the related stages and conductors are referenced by numerals in the 300 series to facilitate comparison therewith. Again, selector switch portions 26*d* and 28*d* are identical to the previously illustrated and described switch portions 26*a* and 28*a***.

Gate stage **27*b* receives four different input signals, previously described, over the lower four conductors 105, 103, 102, and 87. In addition, stage 27*b* receives another input signal over conductor 108 responsive to transmission of a 0 signal from flip-flop 350 over this conductor to the lower input connection of flip-flop 354, and an input signal can be supplied from either of switch circuits 26*d* or 28*d* over conductors 361 and 108 to the same input connection of stage 27*b*. Lastly, the utmost conductor 109 coupled to the input of circuit 27*b*, receives an input signal either from the reset switching arrangement over conductor 376, or from the 0 output of flip-flop 354** as it is returned from the 1 to the 0 condition.

A single output pulse is issued from circuit **27*b* and applied over conductor 110 to the input circuit of a one-shot (OS) circuit 15, shown in FIGURE 3 as the output pulse generator. A capacitor 116 is provided to facilitate operation of the circuit, and the particulars of the circuit will be specified hereinafter. The upper output connection of OS15 is coupled over a conductor 117 and through an emitter-follower stage 118 to the input connection of a one-shot circuit 119. The output side of emitter-follower 118 is also coupled over a conductor 120 to the upper input connection of each NOR circuit 121 and 122. These circuits are conventional NOR circuits, that is, with a 1 signal received over either of the two input circuits, a 0 signal is transmitted over the output connection to the associated reset driver stage, but if both input connections register 0 signals, then a 1 is transmitted to the associated reset driver. Capacitor 123, and its specific circuit connections in OS119**, will be described hereinafter.

Before considering the positioning and operation of switch 30, it is noted that the lower output connection from stage 15 is coupled over conductor 124 to another one-shot circuit 125, which also includes a capacitor 126. In a preferred embodiment in which one microsecond time-duration timing pulses were received over input conductor 10, and in which it was desired to provide a delay time of six microseconds during the reset operation to allow all of the counting circuits to stabilize after being reset, one-shot circuit 15 was used to provide the desired six-microsecond time delay. In this same arrangement the timing signal produced and applied over conductor 124 to one-short circuit 125 was used to regulate the timing of the 10 microsecond pulse produced by circuit 125, which pulse was passed to line driver circuit 127 to provide an output signal of the requisite energy level to the associated static inverter and electric motor. Thus the output of the system is always a ten microsecond pulse, and the pulse repetition rate is determined by the setting of the respective selector switch, 26 or 28, in turn determined by switch 30.

Switch 30 is shown coupled to the output connection of one-shot circuit 119, which operates as a time delay stage, avoiding aberrations in the system which might otherwise be caused by actuation of switch 30 at the reset time. Fixed contact 33 of switch 30 is coupled to the upper input connection of flip-flop circuit 128, the other input circuit of which is coupled to fixed contact 34. Resistors 129 and 130 are connected in series between switch contacts 33 and 34, and the common connection of these two resistors is coupled to a conductor 141, to which a potential of zero volts is applied, in order to maintain a reference voltage level at the input circuit of flip-flop stage 128. The 0 output of flip-flop 128 is coupled over conductor 131 to one input connection of an incandescent indicator lamp 132, and the same output connection of flip-flop 128 is also coupled over conductor 133 to the other input connection of NOR stage 121. Thus, with switch 30 in the illustrated position and flip-flop 128 signifying a 1 output, a 0 signal is applied over a conductor 133 to NOR121. When a 0 signal is concomitantly applied from emitter-follower 118 over conductor 120 to the other input circuit of NOR121, a 1 output issues from the NOR and passes through reset driver 20 and to each of the switch sections **26*a*–26*d* to reset the individual digit counting circuits 11*a*–11*d*** to the complement of the desired number.

The 1 output connection from flip-flop 128 is coupled over a conductor 134 to another incandescent indicator lamp 135, and the same output connection of flip-flop 128 is also coupled over conductor 136 to the other input connection of NOR122. The common input connections of indicator lamps 132 and 135 are connected together, and coupled over conductor 137, switch 138, and resistor 139 to an energy input conductor 140. Another common connection between lamps 135 and 132 is coupled over another conductor to the energy input conductor 141, and a third energy input conductor 142 applies a different potential to another point of the indicator circuit as shown. A capacitor 143 is coupled between conductor 141 and the common junction of switch 138 and resistor 139. Another switch 144 is provided in the circuit to selectively short out resistor 139. In a preferred embodiment, a positive 12 volt D.C. potential was applied over conducor 142; a zero D.C. voltage was applied over conductor 141; and a negative 12 volt D.C. voltage was applied over conductor 140. The provision of two switches, 138 and 144, enables the system to be energized without imposing a strong transient voltage on the power supply. More specifically, capacitor 143 is charged through a circuit including resistor 139; after the charge has reached a level near its maximum level, after only a few time constants, switch 144 is closed to short out resistor 139. Second switch 138 is then closed to complete energization of the circuit.

The six microsecond delay generated in one-shot circuit 15 has been mentioned. Although in its broader aspects the ivention contemplates the insertion of a number which is the complement of the desired count, actually the switching arrangements are wired to insert a number which is the complement, plus one. A six microsecond delay allows the system to be completely stabilized for receipt of the first impulse over conductor 10 after the entire system has been cycled and a reset pulse applied over either one of conductors 78 or 79. That is, instead of wiring the system to detect a count of 9999, allowing for the delay time to protect the system against premature operation before stabilization is reached, the system is wired to detect a count of 9993. Detecting a count of 9993 compensates not only for the six microsecond reset time but also subtracts the plus one term that was inserted by the complement switch 26 or 28. Upon the accumulation of this count, a signal is applied over conductor 110 to circuit 15. However, in that the operating time of the gate circuits 27*a*, 27*b* is approximately a microsecond, those skilled in the art will appreciate that the switches and the associated circuitry are wired to detect the count of 9992, thereby allowing for operation of the system, generation of the reset pulse, issuing of the output pulse over conductor 18 to the associated equipment, and complete stabilization of all the digit counting circuits (manifestly the main concern is the first digit counting circuit, 11*a*) before the next input pulse is received. The invention accomplishes all these ends with precision, and in addition, there is the substantial advantage of lessened expense by reason of the lower response time demands imposed on the decade counting circuits 11*b*, 11*c*, and 11*d*, realized by the novel system arrangement in which a complementary number is actually inserted into the selector switch.

To assist those skilled in the art in making and using the invention, detailed circuit identification of the system components shown in FIGURES 3 and 5A–5C is set out hereinbelow. It is to be understood, however, that this specific information is given by way of illustration only and in no sense by way of limitation of the broad system concept.

The following components are identified with legends used by Engineered Electronics Company, 1441 E. Chestnut Ave., Santa Ana, California, from which company the components are commercially available.

| Component: | Identification |
|---|---|
| **50, 52** (on same card) | CT-801A-2 |
| **53, 54** (on same card) | CT-801A-2 |
| **51, 151, 251, 351** (on same card) | CT-642-2 |
| **56** | CT-304-4 |
| **150, 152, 153, 250** (on same card) | CT-102A-4 |
| **154, 252, 253** | CT-101B-3 |
| **254, 350, 352** | CT-101B-3 |
| **353, 354** | CT-101B-3 |
| **273** | CT-651-2 (Option 2) |
| **276** | CT-651-2 (Option 2) |
| **15, 119, 125** (on same card) | CT-166-4 |
| Capacitor **116** (B, J connections) | 380 mmfd. |
| Capacitor **123** (C, N connections) | 120 mmfd. |
| Capacitor **126** (D, T connections) | 560 mmfd. |
| **118, 20, 29** (on same card) | CT-304-4 |
| **121, 122** (on same card) | CT-304 |
| **128** | CT-101B-3 |
| Resistor **129** | 22,000 ohms |
| Resistor **130** | 22,000 ohms |

While only particular embodiments of the invention have been described and illustrated, it is manifest that alterations and modifications may be made therein. It is therefore the intention in the appended claims to cover all such modifications and alterations as may fall within the true spirit and scope of the invention.

What is claimed is:

1. In a system for counting incoming pulses received over an input circuit and for issuing over an output circuit a single pulse responsive to the accumulation of a preset total of the incoming pulses, the combination of:

a counter, including a plurality of digit counting circuits, operative to accumulate said incoming pulses;

a selector switching arrangement operative responsive to the receipt of information denoting a desired count to apply to said digit counting circuits complementary information denoting a number which is the nines complement of the desired count;

circuit means including a gate circuit for issuing a single timing pulse responsive to the accumulation in said counter of a total equal to the full count of said counter, and a pulse generator circuit coupled in series with said gate circuit for producing an output pulse delayed relative to said timing pulse by a time period during which at least one incoming pulse is received over said input circuit to provide true complementary operation; and circuit means for effecting reset of the counter responsive to the issuing of said output pulse from said pulse generator circuit.

2. In a system for counting incoming signals received over an input circuit and for issuing over an output circuit a single signal responsive to the accumulation of a predetermined count of incoming signals, the combination of:

a decade counter, including a plurality of digit counting circuits, coupled to the input circuit and operative to accumulate the incoming signals;

a selector switching arrangement, coupled to each of said digit counting circuits, and operative responsive to the receipt of numerical information denoting a desired count to apply to said digit counting circuits complementary numerical information denoting a number which is the nines complement of the desired count, such that the total of the desired count information and the complementary numerical information is always the same value;

a gate circuit, coupled to each of said digit counting circuits, for issuing a single timing signal responsive to the accumulation in said decade counter of a total equal to the full count of the decade counter, which full count corresponds to said same value;

an output circuit, coupled in series with said gate circuit, for producing an output pulse delayed in time with respect to said timing signal by a time period during which at least one incoming signal is received over said input circuit to provide true complementary operation; and circuit means, coupled between said output circuit and said selector switching arrangement, for effecting reset of the counter responsive to the issuing of a single output pulse from said output circuit.

3. A counting system as set forth in claim 2 and in which, although the same constant value is maintained, the complementary numerical information is always increased by a given amount corresponding to an extension of said time period during which said output circuit operates to produce said output pulse to enable the system to reset and stabilize for the next series of incoming signals.

4. In a counting arrangement for receiving input signals at a predetermined frequency over an input circuit and for issuing over an output circuit a single signal responsive to the accumulation of a predetermined count of said input signals, the combination of:

a counter, comprising a plurality of digit counting circuits for continuously accumulating the input signals received;

a first selector switch operative responsive to receipt of information denoting a desired count to insert in said counter a number which is the nines complement of the desired count;

a second selector switch operative responsive to receipt of information denoting a desired count to insert in said counter a number which is the nines complement of the desired count;

a gate circuit operable to provide a single timing signal upon the registration in said counter of a count equal to the full count of said counter;

a delay circuit, coupled in series with said gate circuit, operative a preset time after receipt of said timing signal from the gate circuit both to provide a single pulse for issuance over said output circuit and to provide a reset pulse, which preset time is at least equal to the time period during which one input signal is received over said input circuit; and switching means, coupled to said delay circuit, operable to pass said reset pulse through only one of said first and second selector switches upon the issuing of said single pulse over the output circuit, the switching means thus determining which of said selector switches regulates the complement number inserted in the counter.

5. In a counting arrangement for receiving input pulses at a predetermined frequency over an input circuit and for issuing over an output circuit a single operating pulse responsive to the accumulation of a predetermined count of said input pulses, the combination of:

a counter comprising a plurality of digit counting circuits, at least one of said counting circuits being coupled to the input circuit, for continuously accumulating the input pulses received;

first selector switch means, coupled to each of said digit counting circuits, operative responsive to receipt of information denoting a desired count to insert in said counter a number which is the nines complement of the desired count;

second selector switch means, coupled to each of said digit counting circuits, operative responsive to receipt of information denoting a desired count to insert in said counter a number which is the nines complement of the desired count;

a full count gating circuit, coupled to each of said digit counting circuits, operable to provide a single timing pulse upon the accumulation in said counter of a full count equal to the sum of the complement number as provided by one of said first and second selector switch means plus the accumulation of input pulses;

a first delay circuit, coupled in series with said full count gating circuit, operative at a predetermined time after receipt of said timing pulse from the full count gating circuit both to pass an operating pulse toward said output circuit and to provide a reset pulse, which predetermined time is at least equal to the time in which an input pulse is received over said input circuit; and switching means, coupled between said first delay circuit and each of said first and second selector switch means, for applying said reset pulse through only one of said selector switch means as the operating pulse is passed toward said output circuit, whereby the position of said switching means selects the one of said selector switch means which inserts the complement number in the counter.

6. A counting arrangement as claimed in claim 5, in which said first delay circuit produces a predetermined time delay which exceeds the period of one input pulse by an amount equal to an integral number times said period to enable the counter to be reset and stabilized during the extended delay period, and in which said selector switches are connected to increase the inserted number by a value corresponding to said integral number.

7. A counting arrangement as claimed in claim 5, and in which a second delay circuit is coupled between said first delay circuit and said switching means, to minimize error in application of said reset pulse when said switching means is actuated after said operating pulse has been initiated.

8. A counting arrangement as claimed in claim 7 and in which a pair of NOR circuits are provided, means for respectively coupling the output circuits of said NOR circuits to the first and second selector switch means to apply the reset pulses thereto, means for coupling a first input of each NOR circuit to the output side of said first delay circuit and for coupling a second input of each NOR circuit through said switching means to the output side of said second delay circuit, to preclude application of the reset pulse to either of said selector switch means until the elapse of the total time period required for successive operation of said first and second delay circuits.

References Cited by the Examiner

UNITED STATES PATENTS 2,669,388 2/1954 Fox ---------------- 235—92

OTHER REFERENCES

"Predetermined Counter for Process Control" by Blume, from "Electronics," February 1948, pp. 88–93.

"Predetermined Counters" by Wild, from "Electronics," March 1947, pp. 120–123.

MAYNARD R. WILBUR, *Primary Examiner.*

J. F. MILLER, *Examiner.*